United States Patent [19]

Chinn

[11] 3,800,649

[45] Apr. 2, 1974

[54] HARD BOILED EGG SLICING APPARATUS

[76] Inventor: Von Zill Chinn, 4603-124th Ave. So., Seattle, Wash. 98178

[22] Filed: Oct. 19, 1972

[21] Appl. No.: 299,055

[52] U.S. Cl. .............................. 83/651.1, 83/466.1
[51] Int. Cl. ........................ B26d 1/00, A47j 43/00
[58] Field of Search ....... 83/651.1, 466.1, 563, 588, 83/620

[56] References Cited
UNITED STATES PATENTS

| 2,073,257 | 3/1937 | Van Riper | 83/651.1 X |
| 3,112,781 | 12/1963 | Popeil | 83/651.1 X |
| 3,354,546 | 11/1967 | Pagliuca | 83/651.1 X |
| 2,563,237 | 8/1951 | Grocoff | 83/651.1 |
| 3,145,743 | 8/1964 | Cronheim | 83/466.1 |
| 3,561,511 | 2/1971 | Kummer | 83/651.1 |

Primary Examiner—Willie G. Abercrombie
Attorney, Agent, or Firm—Graybeal, Barnard, Uhlir & Hughes

[57] ABSTRACT

A hard boiled egg slicing unit having both horizontally and vertically movable slicing portions whereby a hard boiled egg may be selectively sliced along a plurality of parallel and/or transverse planes to provide a wide variation of egg slice shapes. The horizontal slicing unit includes a plurality of vertically spaced slicing wires mounted for horizontally pivotal movement with respect to an egg supporting platform mounted on a base member, and further includes a horizontally pivotal egg side support structure which is slotted to receive the vertically spaced slicing wires and prevents the sliced egg from being moved from the egg supporting platform during horizontal slicing. The vertically movable slicing portion includes a top frame mounted for sliding movement on one or more vertical guide columns extending upwardly from the base member. The top frame includes resilient means biasing the frame upwardly such that the top frame is at rest in the raised position and is manually slidable down the guide columns toward the egg supporting platform during slicing. The top frame includes a side opening into which slicing wire supporting frames mounting variously positioned slicing wires may be selectively inserted.

4 Claims, 7 Drawing Figures

PATENTED APR 2 1974  3,800,649

HARD BOILED EGG SLICING APPARATUS

BACKGROUND OF THE INVENTION

1. Field of the Invention

This invention relates, in general, to hard boiled egg slicing devices, and in particular, to a device capable of slicing an egg in a wide variety of planes without reorientation of the egg.

2. Description of the Prior Art

Slicing devices for slicing hard boiled eggs or the like in one or more steps are known per se. For example U.S. Pat. No. 2,455,416 discloses a device for slicing a vertically positioned egg horizontally into layers in one step. U.S. Pat. No. 2,095,913 discloses a device of different construction which is also capable of slicing an end held egg into horizontal layers, as does U.S. Pat. No. 2,240,221 although in this latter patent the egg is positioned on its side in a supporting cup prior to its being sliced into layers. U.S. Pat. No. 3,116,770 discloses a hand held device for sectioning a hard boiled egg along vertical lines, while U.S. Pats. Nos. 3,112,781 and 3,145,743 disclose slicing devices capable of slicing an egg along two transverse planes the former by pushing the egg through a slicing screen and the latter by pivoting transversely oriented slicing plates through a stationary side mounted egg.

BRIEF SUMMARY OF THE INVENTION

A uniquely configured slicing apparatus having both vertically movable and horizontally pivotal slicing wire portions movable with respect to a hard boiled egg mounted on an egg supporting platform is disclosed. The horizontally pivotal slicing wire portion includes slicing wires mounted horizontally on a frame which is pivotal with respect to the egg supporting platform and additionally pivotal with respect to an egg side supporting structure which prevents the egg from being moved laterally off of its supporting platform as the horizontal slicing wires are passed therethrough. The egg side supporting structure includes horizontal slots adapted to receive the slicing wires. Both the egg side supporting structure and the frame on which the horizontal slicing wires are mounted may be pivoted away from the egg supporting platform to allow the vertical slicing portion of the unit to be slid downwardly on guide columns to slice the already horizontally sliced egg along transverse or parallel vertical planes. The number and orientation of the vertical slices may be controlled by selectively mounting slicing wire support frames having variously oriented slicing wires mounted therein in the sliding top frame. Resilient means are interconnected with the top frame to bias the frame upwardly to its raised position after a manually controlled downward slicing stroke.

It is an object of the present invention, therefore, to provide an egg slicing apparatus capable of slicing an egg into a greater number of shapes than previously possible without manual manipulation or reorientation of the egg during slicing.

Another object of the instant invention is to provide an egg slicing apparatus capable of slicing an egg along three perpendicular planes without movement of the egg.

Still another object of the instant invention is to provide an egg slicing apparatus capable of slicing an egg along horizontal planes and along vertical planes transversely oriented with respect to each other.

One more object of the instant invention is to provide an egg slicing apparatus which is easy to operate to rapidly slice an egg into a variety of relatively geometrically regular shapes.

Other and additional objects and advantages will be apparent from the following description taken in conjunction with the accompanying drawings.

DETAILED DESCRIPTION OF THE INVENTION

Figure 1:
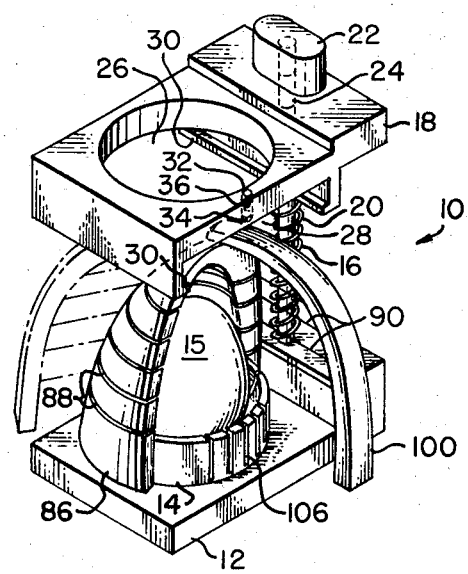
FIG. 1 is a perspective view of a typical egg slicing apparatus constructed according to the instant invention, including the horizontal slicing wires shown in dotted line at their position after pivotally slicing through the egg.

Referring initially to FIG. 1, a slicing apparatus 10 made according to the instant invention is disclosed including a base member 12 having an egg supporting platform 14 mounted thereon to support a hard boiled egg 15 on one of its longitudinal ends. It will be understood that the slicing apparatus disclosed herein may, with apparent modification also be designed to perform the multiple slicing operations described herein with respect to an egg oriented on its side on an egg supporting platform, and this modification is considered to be within the scope of this invention. Base member 12 additionally mounts a vertically oriented guide column 16 on which top frame 18 is slidably mounted for vertical movement. Coil spring 20 is illustrated encircling guide column 16 to bias top frame 18 upwardly against head member 22 fixedly mounted on top of the guide column 16. Top frame 18, includes an opening 24 sized to receive guide column 16, it being understood that if more than one guide column is mounted on base member 12, like openings 24 will be provided in the top frame to receive each guide column.

Top frame 18 includes an additional larger opening 26 vertically aligned with egg supporting platform 14 and sized to pass over and surround said platform when the top frame is manually slid downwardly along guide column 16 against the resistance of spring 20 which is compressed as the top frame is moved downwardly.

Top frame 18 also includes a side opening portion 28, including in the illustrated embodiment a pair of tracks 30 sized to slidably receive a slicing wire support frame of the type illustrated in FIGS. 4–7. Cylindrical slot 32 in top frame 18 slidably mounts a plug 34 which extends into the side opening portion 28. Plug 34 is resiliently mounted on a spring 36 such that it presses against a slicing wire support frame inserted in side opening 28 to hold the frame stationary on slides 30 thereby maintaining the frame centered with respect to opening 26 in the top frame.

Figure 2:
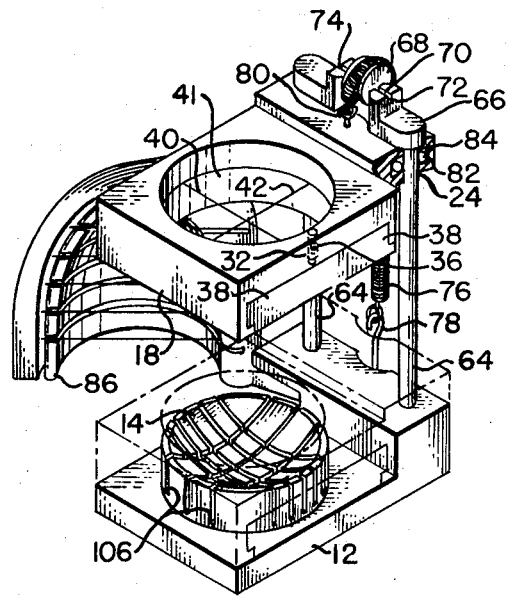
FIG. 2 is a perspective view of another typical embodiment of an egg slicing apparatus constructed according to the teachings of the instant invention, including the top frame shown in dotted line in its downward slicing location.
Figure 4:
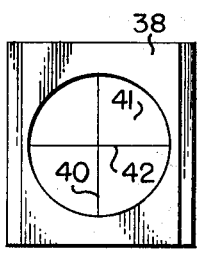
FIG. 4 is a plan view of a typical vertical slicing wire support frame which may be removably mounted in the top frame portion of the slicing units of FIGS. 1 and 2, having a pair of slicing wires oriented at right angles to each other.
Figure 5:
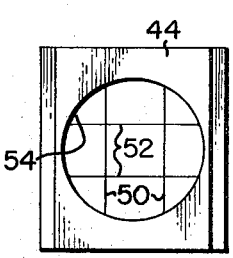
FIG. 5 is a plan view of another typical slicing wire support frame of the type disclosed in FIG. 4 including a plurality of slicing wires oriented to form right angles at their crossover points.

Referring additionally to FIG. 2, slicing wire support frame 38 (also illustrated in FIG. 4) is shown mounted within side opening 34 with the crossover point of slicing wires 40 and 42 centered over egg supporting platform 14 such that movement of the top frame downwardly to surround the egg supporting platform will result in an egg mounted thereon being quartered along its vertical length.

Figure 6:
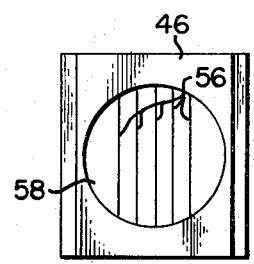
FIG. 6 is a plan view of another typical slicing wire support frame of the type disclosed in FIG. 4 including slicing wires oriented along a plurality of parallel planes.
Figure 7:
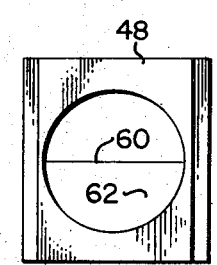
FIG. 7 is a plan view of still another typical slicing wire support frame of the type disclosed in FIG. 4 including a single slicing wire oriented to halve an egg in the vertical direction.

Referring additionally to FIGS. 4–7, slicing wire supporting frames 44, 46 and 48 are illustrated to include a variety of slicing wire arrangements, the selective mounting of which in the top frame 18 allows an egg to be sliced along its vertical length in differing configurations. For example, slicing wire support frame 44 includes pairs of slicing wires 50 and 52 mounted thereon and extending across opening 54 in the supporting frame to slice an egg vertically along pairs of perpendicular planes. FIG. 6 discloses a plurality of parallel slicing wires 56 mounted thereon within opening 58 to slice an egg in a plurality of parallel vertical planes. FIG. 7 discloses a single slicing wire 60 mounted to bisect opening 62 in supporting frame 48 to halve an egg vertically if this frame is selected for mounting in top frame 18. All of the openings 41, 54, 58 and 62 in the slicing wire support frames are substantially equal in size to opening 26 in top frame 18 such that when the slicing wire support frames are selectively inserted in side opening 28 of top frame 18 the like sized openings in the slicing wire support frames and the top frame are vertically aligned.

Referring particularly to FIG. 2, an egg slicing apparatus is disclosed including a pair of guide columns 64 mounted to extend vertically upward from base member 12 to a head portion 66 having a channeled roller 68 mounted for rotation on an axial pin 70 extending between aligned slots 72 and 74. A resilient spring 76 is mounted to extend between hook 78 on base member 12 and hook 80 on top frame 18 to bias the top frame upwardly on guide columns 64 against the bottom of head portion 66. It will be understood that as top frame 18 is manually moved downwardly on guide columns 64 to slice an egg mounted on egg supporting platform 14, spring 76 is stressed around channeled roller 68. This embodiment has been found to provide exceptionally smooth operation. Bearings 82 of the conventional known roller or ball type may be mounted within a slot 84 in the side wall of opening 24 through which the guide columns extend to provide rolling rather than sliding contact between the top frame and the guide columns for added smoothness of operation.

Figure 3:
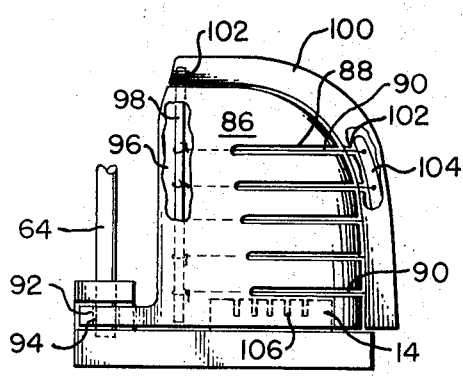
FIG. 3 is a partial side elevation view of a typical egg slicing apparatus made according to the instant invention.

Referring additionally to FIG. 3, the horizontal slicing portion of the instant apparatus is disclosed to include an egg side supporting structure 86 sized to laterally surround a portion of egg supporting platform 14 and extending archedly thereabove a sufficient height to allow a shelled hard boiled egg 15 to be mounted on one of its longitudinal ends on egg supporting platform 14. The arched egg side supporting structure 86 includes a plurality of vertically spaced horizontal slots 88 extending partially therethrough to receive like spaced horizontal egg slicing wires 90 in a manner to be described more completely hereafter.

Egg side support structure 86 includes laterally extending ear 92 having an opening 94 therein through which one of the guide columns 64 extends such that the entire structure 86 may be pivoted about the guide column toward and away from the egg support platform 14.

A cylindrical opening 96 in egg side support structure 86 extends vertically upward adjacent ear 92 to receive a substantially like diameter pin 98 such that the pin may be rotatably pivoted within the cylindrical opening. Curved arm 100 extends outwardly and then downwardly from its connection point 102 with pin 96 such that arm 100 may pass freely over egg side supporting structure 86. It is contemplated, that in another embodiment, pin 98 and arm structure 100 may be formed from a single piece of molded plastic or the like.

Cutting wires 90 extend through holes 102 in arm 100 and are fixedly anchored within a channel 104 in a known manner such as by knotting the end of the wire and filling the channel with epoxy cement or the like. Other known suitable anchoring techniques may also be employed to accomplish a similar result. Cutting wires 90 are fastened at their opposite end at vertically spaced points on pin 98, all of the cutting wires being spaced from each other vertical distances substantially equal to the vertical distances between slots 88 in egg side support structure 86 such that the wires are received by and move through the slots when the arm 100 is pivoted over the egg support structure 14 during slicing.

In operation to slice an egg along three perpendicular planes, a shelled hard boiled egg 15 is mounted endwise on support structure 14 in the manner illustrated in FIG. 1. It will be understood that prior to so mounting the egg, egg side support structure 80 is first pivoted such that it surrounds a portion of egg support structure 14 while horizontal slicing wire support arm 100 is pivoted away from the egg side support structure to the position shown in solid line in FIG. 1. to slice the egg horizontally, arm 100 is pivoted over egg support structure 14 such that the cutting wires 90 pass through the egg and into the horizontally spaced slots in the egg side support structure while the egg side support structure itself remains stationary adjacent the egg supporting platform. As the cutting wires pass through the egg, forces tending to push the egg laterally off of its support platform are absorbed by the egg side support structure such that when the cutting wires have passed completely through the egg and reached the position shown in dashed line in FIG. 1, the egg, although sliced in layers, remains seated in substantially its pre-cut position on the support structure.

To additionally slice the already layered egg vertically, the egg side support structure and arm 100 are pivoted away from egg support structure 14 to the position shown in FIG. 2, and a selected vertical slicing wire support frame such as 38 is slidably inserted within the side opening 28 in top frame 18. Top frame 18 is manually moved downwardly on guide columns 64 till it reaches its lowest position adjacent base member 12 as shown in dashed line in FIG. 2, at which time the egg has been completely sliced vertically along two perpendicular vertical planes. Egg supporting platform 14 includes slots 106 into which wires 40 and 42 move to allow the top frame to contact base member 12. It will be understood that a variety of parallel and perpendicular slots 100 may be provided in support platform 14 to accommodate any selected vertical slicing wire arrangement.

At this point, the entire egg slicing apparatus may be tilted on its side such that the egg which has now been sliced along three perpendiuclar planes falls therefrom into a container or the like. Alternatively, the top frame may be allowed to return to its top position under the urging of springs 16 or 76 and the sliced egg then toppled therefrom.

It will be understood that at the operator's discretion, only the vertical or horizontal slicing operations may be completed to slice an egg along one or two single or sets of parallel or perpendicular planes, and consequently, a wide variety of egg slice shapes may be formed using the disclosed apparatus.

It is contemplated that the egg slicing apparatus of this invention may be formed almost completely from a suitable plastic material, but where necessary, and if desired, stainless steel or the like could also be used satisfactorily.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. Apparatus for selectively slicing a shelled hard boiled egg comprising:
    a base member having a vertically slotted egg supporting platform mounted on the top portion thereof;
    vertically extending guide column means fixedly mounted on said base member laterally adjacent said egg supporting platform;
    horizontal egg slicing means mounted adjacent said base member for pivotal movement with respect to said egg supporting platform; and
    vertical egg slicing means slidably mounted on said guide columns for reciprocal movement thereon.

2. The apparatus of claim 1 wherein said horizontal egg slicing means includes a pivotal egg side support structure positionable about a side portion of said egg supporting platform and extending thereabove, said egg side support structure having a plurality of horizontal slots spaced along its height, and a slicing wire support arm having a plurality of slicing wires spacedly mounted thereon and aligned with said horizontal slots; said slicing wire support arm being pivotal with respect to said pivotal egg side support structure and said egg supporting platform on said base member such that said slicing wires are movable over said egg supporting platform and into said horizontal slots of said egg side support structure.

3. Apparatus for selectively slicing a shelled hard boiled egg comprising:
    a base member having a vertically slotted egg supporting platform mounted on the top portion thereof;
    vertically extending guide column means fixedly mounted on said base member laterally adjacent said egg supporting platform;
    horizontal egg slicing means mounted adjacent said base member for pivotal movement with respect to said egg supporting platform;
    vertical egg slicing means slidably mounted on said guide columns for reciprocal movement thereon;
    said horizontal egg slicing means including a pivotal egg side support structure positionable about a side portion of said egg supporting platform and extending thereabove, said egg side support structure having a plurality of horizontal slots spaced along its height, and a slicing wire support arm having a plurality of slicing wires spacedly mounted thereon and aligned with said horizontal slots;
    said egg side support structure including a generally vertical cylindrical opening in one edge thereof, and said slicing wire support arm including a pin portion positioned for pivotal movement within said cylindrical opening and a curved arm extending outwardly from the top portion of said pin to partially surround said egg side support structure;
    said slicing wires extending between said pin and laterally adjacent points on said curved arm;
    said curved arm being pivotal with respect to said pivotal egg side support structure and said egg supporting platform on said base member such that said slicing wires are movable over said egg supporting platform and into said horizontal slots on said egg side support structure.

4. Apparatus for selectively slicing a shelled hard boiled egg comprising:
    a base member having a vertically slotted egg supporting platform mounted on the top portion thereof;
    vertically extending guide column means fixedly mounted on said base member laterally adjacent said egg supporting platform;
    horizontal egg slicing means mounted adjacent said base member for pivotal movement with respect to said egg supporting platform;
    vertical egg slicing means slidably mounted on said guide columns for reciprocal movement thereon;
    said vertical egg slicing means including a top frame means having first opening means receiving said guide column means;
    second opening means positioned thereon vertically above said egg supporting platform and sized to surround said egg supporting platform when said top frame is moved downwardly on said guide columns;
    slicing wire means mountable in said second opening means such that said slicing wires are aligned with some of said vertical slots in said egg supporting platform;
    said vertical slicing means including coil spring means biasing said top frame toward the top of said guide column means;
    said coil spring means being interconnected between said base member and said top frame;
    channel roller means mounted on top of said guide column means; and,
    the central portion of said spring extending over said channeled roller means.

* * * * *